US007794647B1

(12) United States Patent
Deckard

(10) Patent No.: US 7,794,647 B1

(45) Date of Patent: Sep. 14, 2010

(54) METHOD OF SELECTIVE LASER SINTERING WITH IMPROVED MATERIALS

(76) Inventor: Carl Deckard, 6618 Hergotz Ln., Austin, TX (US) 78742

( * ) Notice: Subject to any disclaimer, the term of this patent is extended or adjusted under 35 U.S.C. 154(b) by 618 days.

(21) Appl. No.: 11/503,628

(22) Filed: Aug. 14, 2006

Related U.S. Application Data

(63) Continuation-in-part of application No. 11/387,673, filed on Mar. 23, 2006.

(51) Int. Cl.
*B29C 65/16* (2006.01)
*C08G 69/04* (2006.01)

(52) U.S. Cl. ...................................... 264/497; 528/323

(58) Field of Classification Search ................ 264/497; 528/323

See application file for complete search history.

(56) References Cited

U.S. PATENT DOCUMENTS 6,136,948 A * 10/2000 Dickens et al. .............. 528/323

* cited by examiner

*Primary Examiner*—Kat Wyrozebski
*Assistant Examiner*—Robert J Grun
(74) *Attorney, Agent, or Firm*—Rick B. Yeager

(57) ABSTRACT

A method of providing improved powder materials for selective laser sintering (SLS). and related sintering including High Speed Sintering and Selective Inhibition Sintering, processing by orienting a polymer material. The improved materials increase the melting temperature thus increasing the process temperature window, reduce or eliminate amorphous regions thus reducing water absorption, reduce the toughness thus making size reduction easier, and increase heat of fusion. The orientation may be accomplished by deforming the polymer by drawing, rolling, machining, equal channel angular extrusion or similar processes, or by a high shear two roll mill.

9 Claims, 1 Drawing Sheet

METHOD OF SELECTIVE LASER SINTERING WITH IMPROVED MATERIALS

CROSS-REFERENCE TO RELATED APPLICATION

This is a continuation-in-part application which is related to and claims the benefit of U.S. patent application Ser. No. 11/387,673 filed Mar. 23, 2006 by applicant.

STATEMENT REGARDING FEDERALLY SPONSORED RESEARCH OR DEVELOPMENT

Not Applicable

REFERENCES

Arakawa and Nagatoshi (Polymer Letters Vol. 8 pgs. 41-45, 1970)

George (High Speed Spinning, Wiley 1985, Ch. 10)

Bankar, Spruiell and White (J of Applied Polymer Science Vol. 21 2341-2358, 1977)

Swerlick et al. (U.S. Pat. No. 2,952,878)

Akutin et al. (U.S. Pat. No. 4,110,395)

U.S. Pat. Nos. 5,017,753; 5,132,143; 5,316,580; 5,597,589; 5,616,294 and 5,639,070 to Deckard;

U.S. Pat. No. 5,155,324 to Deckard et al;

U.S. Pat. Nos. 4,938,816 and 5,053,090 Beaman et al.

U.S. Pat. Nos. 4,944,817; 5,076,869: 5,296,062 and 5,382,308 to Bourell et al.

U.S. Pat. Nos. 5,342,919; 5,527,877; 5,648,450; 5,990,268 and 6,136,948 to Dickens et. al U.S. Pat. No. 6,245,281 B1 to Scholten et. al.

Encyclopedia of Polymer Science and Technology, First and Second and Third editions Flow-Induced Crystallization of Polymers (WILEY-VCH 2002)

ECAE, Campbell, Plastics Rubber and Composites, 1999, Vol 28 No. 10

Hopkinson, N. and Erasenthiran, P., "High Speed Sintering—Early Research into a New Rapid Manufacturing Process", Proceedings of the 15th SFF Symposium, Austin, Tex., USA, August 2004, pp 312-320, ISSN 1053-2153. SFX U.S. Pat. No. 6,589,471: Selective inhibition of bonding of power particles for layered fabrication of 3-D objects Khoshnevis; Behrokh (Los Angeles, Calif.)

REFERENCE TO SEQUENCE LISTING, A TABLE, OR A COMPUTER PROGRAM LISTING COMPACT DISK APPENDIX

Not Applicable

This invention is in the field of rapid prototyping, and is more particularly directed to improved polymer materials for producing functional parts, prototypes, models and tools by way of Selective Laser Sintering (referred to as SLS herein) and methods of making parts from said materials. Of great interest is improvement to Nylon, particularly Nylon 6, Nylon 11 and Nylon 12. Wider process temperature window and less water absorption are objectives.

BACKGROUND OF THE INVENTION

This invention relates to improved powdered or pulverent polymer materials to be transformed into functional parts, prototypes, models or tools (referred to as parts herein) by a SLS machine such as those developed at The University of Texas at Austin and currently sold by 3D Systems of Valencia Calif. and EOS GmbH Electro Optical Systems of Munich Germany.

SLS was invented by this inventor in the mid 1980s at The University of Texas at Austin. A methods and apparatus for sintering a powder into a shaped article in an SLS machine are disclosed in U.S. Pat. Nos. 4,247,508 to Housholder; 4,863,538; 5,017,753; 5,132,143; 5,316,580; 5,597,589; 5,616,294 and 5,639,070 to Deckard; 5,155,324 to Deckard et al; 4,938,816 and 5,053,090 to Beaman et al. Multiple material systems for SLS are disclosed in U.S. Pat. Nos. 4,944,817; 5,076,869: 5,296,062 and 5,382,308 to Bourell et al. Semi-crystalline organic polymers for SLS are disclosed in U.S. Pat. Nos. 5,342,919; 5,527,877; 5,648,450; 5,990,268 and 6,136,948 to Dickens et. al. The significance of the SLS processing temperature window is also discussed. Use of a Nylon 12 powder precipitated from solution in SLS is disclosed in U.S. Pat. No. 6,245,281 B1 to Scholten et. al.

BRIEF SUMMARY OF THE INVENTION

In general, the process of producing a part by SLS includes the steps of: 1) producing the feed stock material, 2) producing a powder from that feed stock (referred to herein as the size reduction step) and 3) producing a part from the powder (referred to herein as the SLS step). The materials that are the subject of the current invention are improved by an orientation step prior to the size reduction step. The focus of this invention is polymer powders with highly oriented molecules and the use of these materials in the SLS process. The orientation can be done by any of several conventional processes that are known to those skilled in the art of film and fiber production. One embodiment uses the high shear two roll mill which is novel.

It is known to those skilled in the art of film and fiber production that the mechanical properties of polymers can be modified by orientation. Applicant has shown the ability to: 1) increase the melting temperature thus increasing the process temperature window, and 2) increase heat of fusion.

Orientation promotes crystallization. This phenomenon is known as stress induced crystallization. Polymers that solidify into a semi-crystalline spherulitic structure without an orientation step can be processed into a linear semi-crystalline structure (the shish-kebab structure) or a paracrystalline structure. Paracrystalline materials do not have identifiable amorphous regions and there is little or no chain folding Paracrystalline materials differ from perfect crystals in that they have inclusions (primarily chain ends) and dislocations.

The orientation is accomplished by deforming the polymer which can be accomplished by drawing, rolling, machining, equal channel angular extrusion or similar processes. Drawing is commonly used in film and fiber production. The steps of quenching and drawing can be combined as in high speed spinning Rolling is commonly used in film production (may be called calendaring in these applications). The rolling step may be done after a quenching step. Alternately, the quenching step and the rolling step may be combined by extruding a molten polymer into the nip of the rolls. The orientation effect is increased if the surface speed of the two rolls are different (high shear two roll mill). Rolling can also be applied to discreet materials (for example, rolling pellets into chips). Machining (for example, turning on a lath) produces chips that have higher orientation than the stock from which they are machined. Equal channel angular extrusion is a process where large strains can be achieved without changing the shape of the sample allowing multiple passes and high accumulated strains.

The increase in the melt onset temperature caused by the orientation process allows the use of a higher SLS part bed temperature than would be possible with a powder of the same composition produced by grinding of extruded pellets crystallized at low stress. This higher permissible part bed temperature increases the temperature window of the SLS process and makes the process more tolerant of temperature variations across the part bed and temperature variations with respect to time, thereby leading to better part quality and throughput.

The term size reduction step includes but is not limited to the processes of crushing, grinding, attrition, chopping, milling and cutting. The powders are typically post processed after size reduction to control particle size distribution, particle shape and moisture content. The post-processing may include but is not limited to sieving, air classifying, tumbling, and drying.

Prior art SLS materials are deficient in omitting the orientation step.

DETAILED DESCRIPTION OF THE INVENTION

Figure 1:
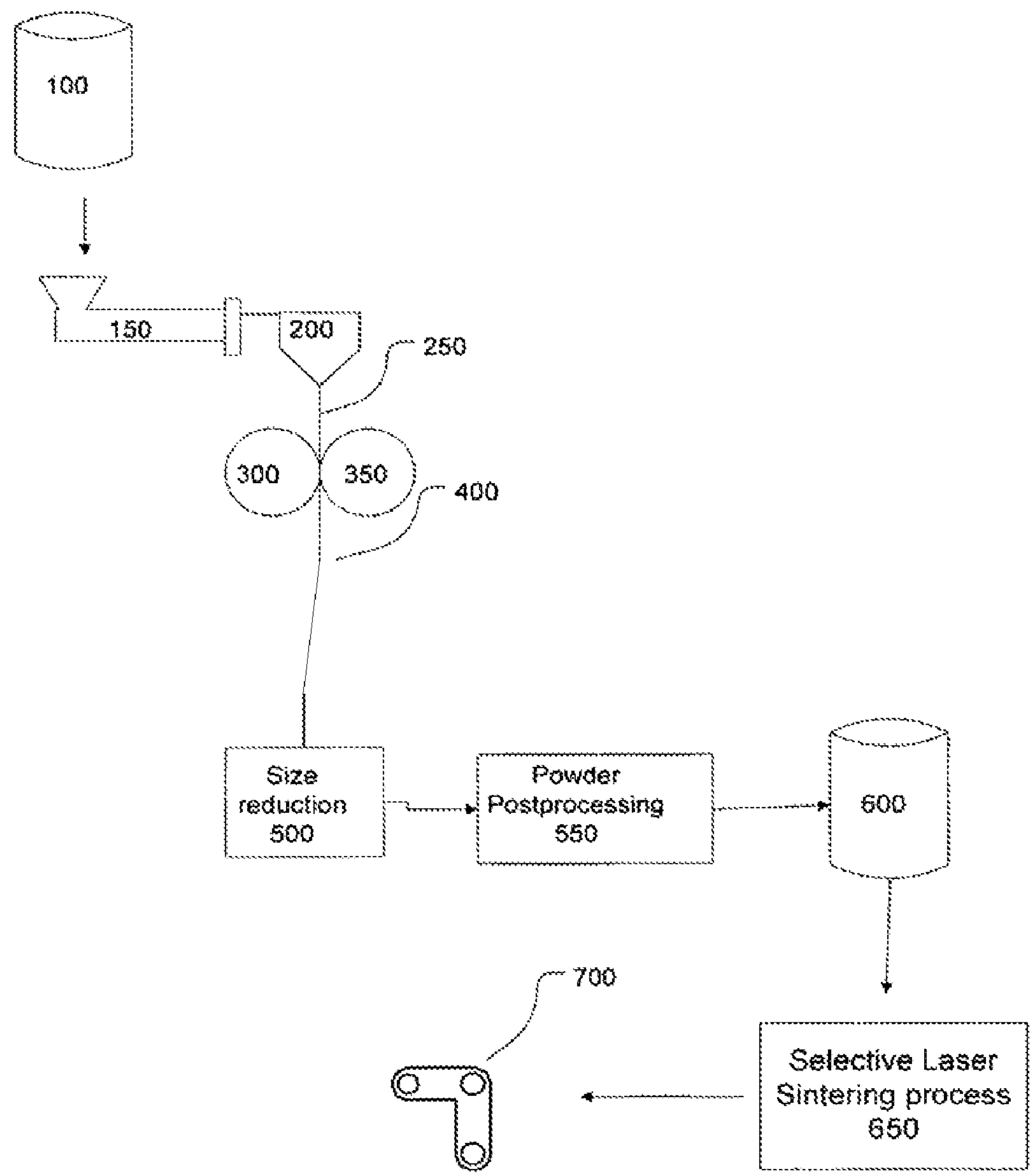
FIG. 1 is a flow chart illustrating the method of producing a part to the preferred embodiment of the invention.

In one embodiment, polymer film is formed by an extrusion step followed by solidification in a high shear two roll mill producing a highly oriented film. Preferably, the surface speed of the first and second rolls are different, thereby causing a high shear zone in the nip between the rolls. Alternately, the rolls can have the same surface speed. This will lead to high orientation but not as high as if the surface speeds are different. This method of producing a highly oriented film was developed by this inventor and was not found in the literature.

The resulting film is then processed into a powder by a size reduction step. The resulting powder is then used in the SLS process.

The resulting powder will have improved properties as compared to the input material including but not limited to the following: larger temperature window, higher heat of fusion, lower water absorption.

FIG. 1 illustrates this method of producing a part by the first embodiment of the invention. The polymers start as pellets 100. The polymer is then processed into a highly oriented film 400 by the steps of melting in extruder 150, extrusion through a sheet die 200 creating melt 250, solidification in a high shear two roll mill comprising a first roll 300, and a second roll 350.

This highly oriented film 400 is then processed into a powder 600 by a size reduction step 500 and a powder post-processing step 550. The powder postprocessing step 550 may include but is not limited to sieving, air calcification, drying and tumbling with the effect of controlling the particle size distribution, particle shape and moisture content. This resulting powder 600 is then used to produce a part 700 by the SLS process 650.

In another embodiment, a highly oriented film is produced by the steps of: 1) extruding a molten polymer onto a quench roll, and 2) drawing the film between godets.

This technique of producing highly oriented film is well known to those skilled in the art. This film is then size reduced and the resulting powder is then used to produce a part by the SLS process.

In another embodiment the drawing step is replaced by a film blowing step to produce the highly oriented film. This technique of producing highly oriented film is well known to those skilled in the art.

In another embodiment, traditional fiber processing techniques including but not limited to: extrusion, spinning, drawing, can be used to produce a highly oriented fiber which can be substituted for the highly oriented film.

In another embodiment, high speed spinning, which is generally defined as spinning with a takeup speed of 3000 meters per minute or more, can be used to produce a highly oriented fiber which can be substituted for the highly oriented film.

In one embodiment of the current invention a polymer is oriented, then size reduced, then a part is produced from the resulting powder by an SLS step.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. While the present invention is particularly directed to improved materials for SLS, it is of course contemplated that additional applications for said materials will be apparent to those of ordinary skill in the art having reference to this specification and its drawings. In particular, it is contemplated that the present invention will be applicable to SLS-like processes including but not limited to High Speed Sintering and Selective Inhibition Sintering. It is contemplated that such modifications and alternatives are within the scope of this invention as subsequently claimed herein.

What is claimed is:

1. A method of producing a three-dimensional object, comprising the steps of:

orienting a polymer material to produce a linear semi-crystalline structure or a paracrystalline structure;

producing a powder from said oriented polymer material by a size reduction step; and using the powder in a selective laser sintering process to fabricate the object.

2. The method of claim 1, wherein orienting a polymer material further comprises extruding and solidifying the polymer material in a two roll mill.

3. The method of claim 1, wherein the polymer material is chosen from the group consisting of polyamide 11, polyamide 12, and polyamide 6.

4. The method of claim 1 wherein orienting a polymer material further comprises producing a polymer film.

5. The method of claim 1 wherein orienting a polymer material further comprises producing a polymer fiber; and producing a powder from said oriented polymer material by a size reduction step further comprises producing a powder from said fiber by a size reduction step.

6. The method of claim 1 wherein the powder is paracrystalline.

7. The method of claim 1 wherein the powder has no identifiable amorphous regions.

8. A powdered polymer material produced by the steps of:

orienting a polymer material to produce a linear semi-crystalline structure or a paracrystalline structure; and size reducing said material.

9. A method of producing a three-dimensional object, comprising the steps of:

orienting a polymer material to produce a linear semi-crystalline structure or a paracrystalline structure; producing a powder from said oriented polymer material by a size reduction step; and using the powder to fabricate the object by a process selected from the group consisting of Selective Laser Sintering, High Speed Sintering and Selective Inhibition Sintering.

* * * * *